Feb. 25, 1958  G. WEISSENBERG ET AL  2,824,987
ELECTRON OPTICAL ELEMENTS AND SYSTEMS EQUIVALENT TO
LIGHT OPTICAL PRISMS FOR CHARGE CARRIERS
IN DISCHARGE VESSELS.
Filed May 5, 1953  9 Sheets-Sheet 1

INVENTORS:
GUSTAV WEISSENBERG
GUNTHER BARTZ
BY
Richardson, David and Nordon
ATTYS Feb. 25, 1958 G. WEISSENBERG ET AL 2,824,987
ELECTRON OPTICAL ELEMENTS AND SYSTEMS EQUIVALENT TO
LIGHT OPTICAL PRISMS FOR CHARGE CARRIERS
IN DISCHARGE VESSELS Filed May 5, 1953 9 Sheets-Sheet 2

INVENTORS:
GUSTAV WEISSENBERG
GUNTHER BARTZ
BY
Richardson, David and Nordon
ATTYS

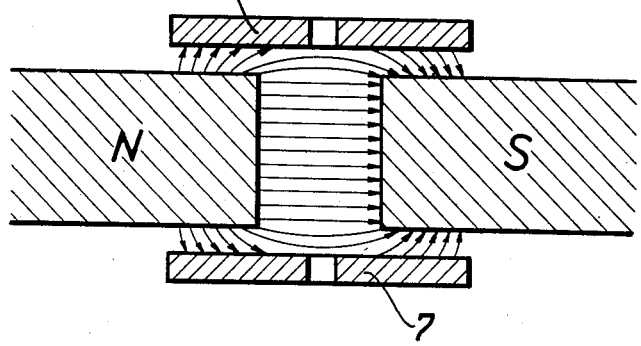
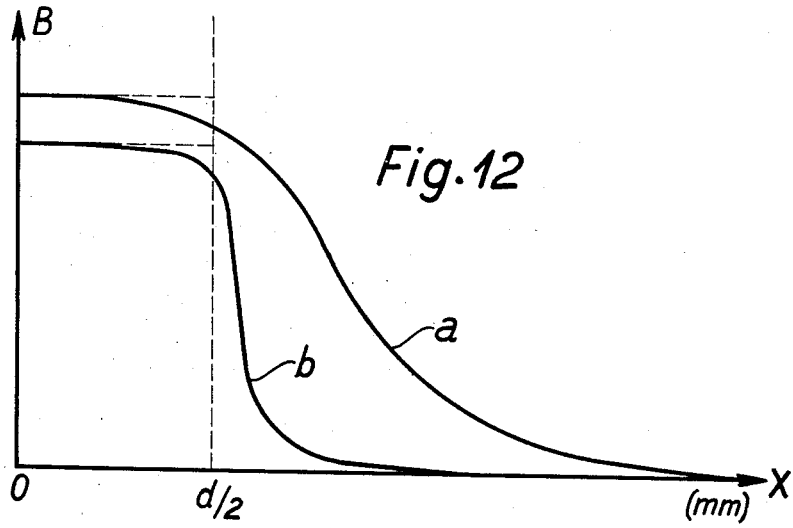
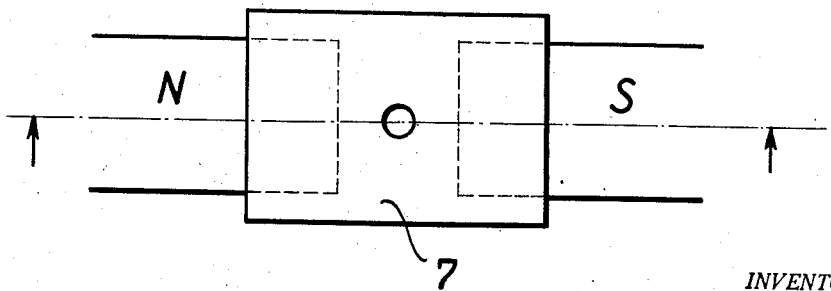

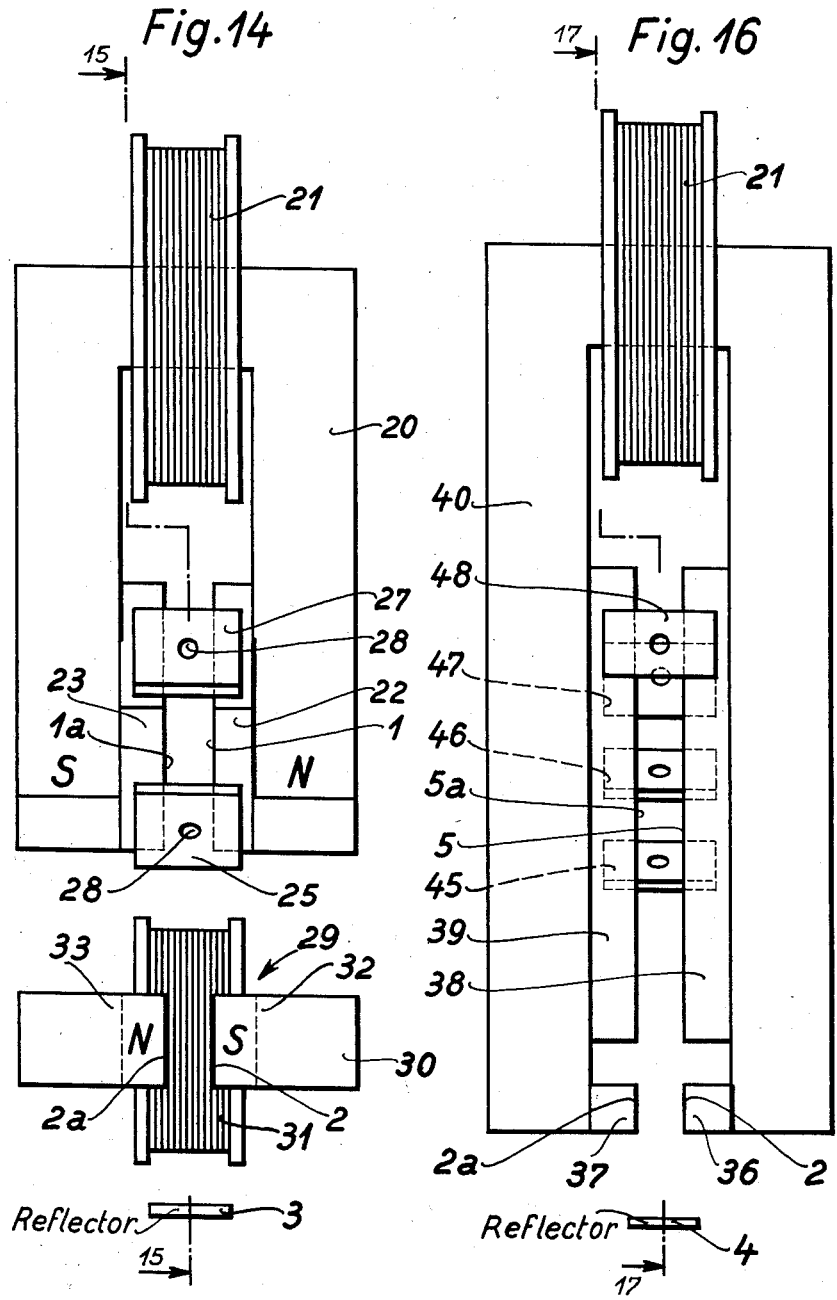

Feb. 25, 1958  G. WEISSENBERG ET AL  2,824,987
ELECTRON OPTICAL ELEMENTS AND SYSTEMS EQUIVALENT TO
LIGHT OPTICAL PRISMS FOR CHARGE CARRIERS
IN DISCHARGE VESSELS
Filed May 5, 1953  9 Sheets-Sheet 8

INVENTORS:
GUSTAV WEISSENBERG
GUNTHER BARTZ
BY
Richardson, David and Nordon
ATTYS Feb. 25, 1958 G. WEISSENBERG ET AL 2,824,987
ELECTRON OPTICAL ELEMENTS AND SYSTEMS EQUIVALENT TO
LIGHT OPTICAL PRISMS FOR CHARGE CARRIERS
IN DISCHARGE VESSELS
Filed May 5, 1953 9 Sheets-Sheet 9

INVENTORS:
GUSTAV WEISSENBERG
GUNTHER BARTZ
BY
Richardson, David and Vordon
ATTYS United States Patent Office 2,824,987
Patented Feb. 25, 1958

2,824,987

ELECTRON OPTICAL ELEMENTS AND SYSTEMS EQUIVALENT TO LIGHT OPTICAL PRISMS FOR CHARGE CARRIERS IN DISCHARGE VESSELS

Gustav Weissenberg, Marburg (Lahn), and Gunther Bartz, Marbach Kreis Marburg (Lahn), Germany, assignors to Ernst Leitz G. m. b. H., Wetzlar, Germany Application May 5, 1953, Serial No. 353,078

Claims priority, application Germany May 12, 1952

6 Claims. (Cl. 313—76)

The present invention relates to electron-optical systems and more particularly to electron-optical prisms and means for obtaining a uniform magnetic field in such prisms, the uniform field having sharply defined boundary planes.

Prism systems of the character involved in the present invention are suitable for general use in electronic apparatus such as electron amplifier and control tubes, picture scanning tubes, electron microscopes, mass spectrometers, mass spectrographs and other similar apparatus.

The apparatus of the present invention may be used, for example, in an electron microscope as disclosed in the copending application of Gustav Weissenberg, one of the present applicants, Serial No. 507,452, filed on May 10, 1955, which application is entitled to the priority of a corresponding application filed in Germany on August 29, 1949, pursuant to the provisions of Public Law 619 (83d Congress, 2d session, 68 Stat. 764).

Among the objects of the invention is the provision of compound electron prism systems for the bending of electron streams or other streams of charged particles in a manner analogous to the bending of light rays by optical prism systems.

Another object of the invention is to provide a simple electron-optical prism comprising a uniform magnetic field which is bounded by sharply defined planes.

A further object of the invention is to provide a uniform magnetic field between two pole pieces of magnetic material having parallel plane surfaces and minimizing the fringe effects at the edges of the pole pieces by the provision of apertured diaphragms of magnetically permeable material spaced from the sides of the pole pieces, the apertures being located to permit the passage of the beam of charged particles therethrough both before and after deflection.

A further object of the invention is to provide a magnetic structure having V-shaped pole faces which deflect the beam of charged particles once in passing across one leg of the V and again in passing across the other leg of the V, the angles of incidence and emergence and the distance of the beam from the apex of the V being so arranged that the convergence or divergence of the beam remains unchanged after deflection and no astigmatism is introduced in the course of deflection.

Still another object of the invention is the provision of methods and means whereby the fringe effects of stray or non-uniform fields at the edges of the V-shaped pole faces are eliminated by so focusing a converging arriving beam of charged particles that a real image is formed at the bisector plane of the dihedral angle formed by the legs of the V, thereby correcting the fringe effect distortion of the entering beam by an equal and opposite distortion of the emerging beam.

A further object of the invention is to deflect a beam of charged particles through total angle of substantially 360 degrees so that it emerges, after deflection, approximately in alignment with its original path of travel, modified, however, by any effects caused by a reflection which takes place in the course of the 360 degree deflection. The reflection may take place from an image forming surface so that the beam continues in its original direction with the characteristics of the image impressed thereon.

A further object of the invention is the provision of a uniform magnetic field having the shape of an equilateral parallelogram such that the arriving beam first traverses two opposite parallel sides and the emerging reflected beam traverses the other two opposite parallel sides, the beam being deflected during each traverse of the field through an angle slightly exceeding 90 degrees, a further oppositely directed field being provided for deflecting the beam through an angle equal and opposite to the slight angle of excess over 90 degrees so that the direction of the beam both upon arriving at the reflecting surface and after reflection therefrom is substantially normal to the reflecting surface.

Still another object of the invention is the provision of a 360 degree deflection system similar to the preceding system, but using W-shaped pole faces, such that the arriving beam is deflected by one V-shaped portion of the W and the reflected beam is deflected by the other V-shaped portion thereof, thereby making it possible to use the astigmatism preventing and fringe effect techniques of the invention which are particularly applicable to a structure having pole faces of V-shaped configuration.

Still another object of the invention is the provision of compound electron optical prism systems by the use of magnetic pole pieces having opposed plane parallel pole face surfaces of novel configuration for producing compound bending action with respect to the electron beam.

The electron-optical elements and systems of the present invention consist of uniform magnetic deflecting fields which satisfy very definite "optical requirements." They make it possible to deflect moving charge carriers or streams of charged particles through any desired angle from their original direction, while maintaining the "optical" requirements. The expression "deflecting fields" includes the magnetic fields of permanent magnets, electromagnets or the fields of "Helmholtz" coils.

The "optical" requirements satisfied by the electron-optical systems of the present invention consisting of uniform magnetic deflecting fields can be desired generally by the following statements. In this connection, it is to be understood that the term "rays" is used below to refer to the paths of the electrons, ions, or similar charged particles. These requirements may be stated as follows:

(1) Parallel rays of charged particles shall be deflected through a predetermined angle and remain parallel rays after deflection. This "optical" requirement can be still further amplified to the effect that;

(2) Slightly convergent or divergent beams of rays shall be so deflected through the predetermined angle, that after emergence from the deflecting field, the angle of convergence or divergence of the rays remains unchanged and that;

(3) The convergent or divergent beams of rays shall not exhibit any astigmatism after emerging from the electron-optical system, i. e. a beam of circular cross-section shall remain circular after deflection and not be distorted into an ellipse.

The above enumerated requirements can be complied with in practice for narrow beams within the meaning of Gaussian dioptrics.

In the further development of the electron-optical elements and systems consisting of magnetic deflecting fields of the present invention, the distorting influence of the fringe effects of the magnetic fields is compensated by two different methods for the above-mentioned angles of deflection.

Other and further objects will become apparent upon reading the following specification together with the accompanying drawing forming a part hereof.

Referring to the drawing:

Figure 1 is a perspective view of a magnet having pole pieces with opposed spaced plane parallel pole faces for providing a substantially uniform magnetic field, the opposed plane parallel pole face surfaces being of rectangular configuration.

Figure 2 is a diagrammatic representation of the deflecting action produced by a uniform magnetic field bounded by spaced parallel planes separated by a distance, the boundary planes being parallel to the direction of the flux of the magnetic field. The angle of incidence of the beam is normal to one of the boundary planes and the component rays of the beam are parallel both before and after deflection.

Figure 11 is a diagrammatic representation of an arrangement for obtaining a uniform magnetic field in which the fringe effects at the edges of the parallel pole faces are corrected to obtain sharply defined boundary planes.

Figure 12 is a graph showing the normal uncorrected field strength distribution with respect to distance from the center of the pole faces and the increased sharpness of boundary plane definition obtained by the use of the corrective arrangement shown in Figure 10.

Figure 13 is a side view of the fringe effect correcting means shown in Fig. 11.

Figure 14 is a side view of apparatus diagrammatically shown in Fig. 5.

Figure 16 is side view of apparatus diagrammatically shown in Fig. 9.

Figure 1:
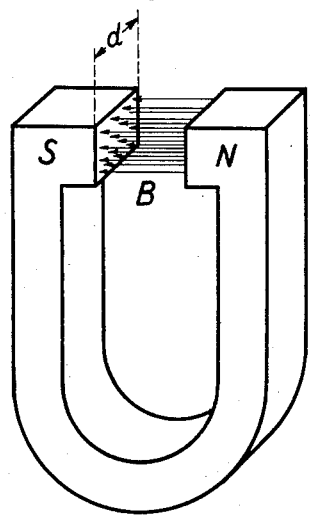

In order to explain the electron-optical systems and the operation of the uniform magnetic deflecting fields of the present invention, let us consider the property of a simple magnetic field having plane boundary surfaces which are parallel to each other and to the direction of the magnetic flux, whose distribution is homogeneous between the two boundary planes. In Fig. 1 there is shown such a field while Fig. 2 is a section perpendicular to direction of magnetic flux, or B-vectors and which is traversed by a beam of moving charged particles.

Figure 2:
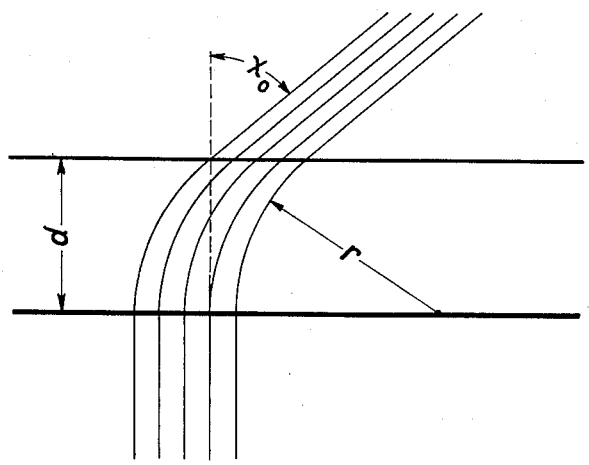

In Figure 2 and other similar figures, both the boundary planes of the deflecting field and the direction of the magnetic flux are perpendicular to the plane of the paper as viewed in the drawing. The charged particles travel in paths which lie between spaced parallel boundary planes parallel to the plane of the paper and are assumed to be either of uniform mass, charge and velocity, or to be such that the product of the mass/charge ratio of each particle multiplied by its individual velocity is uniform for all the particles.

In order to deflect a parallel beam of rays through a given angle $\chi_0$, in such a manner that it remains parallel after deflection, the following conditions must be met as may be noted in Fig. 2.

(1) $$\frac{d}{r} = \sin \chi_0$$

in which (2) $$r = \frac{mv}{eB}$$

In this equation:

$d$ is distance between the parallel boundary planes and is determined by the width of the two pole faces;

$m$ is the individual mass of each charged particle;

$v$ is the uniform velocity of the charged particles;

$e$ is the charge of each particle;

$B$ is the flux density or magnetic induction;

$\chi_0$, is the angle of deflection, in which connection $0° < \chi_0 < 90°$.

Such an electron-optical system consisting of a single magnetic deflecting field is therefore inherently able to deflect a parallel beam which impinges at right angles to the incident boundary plane of the deflecting field, through an angle $\chi_0$.

Figure 3:
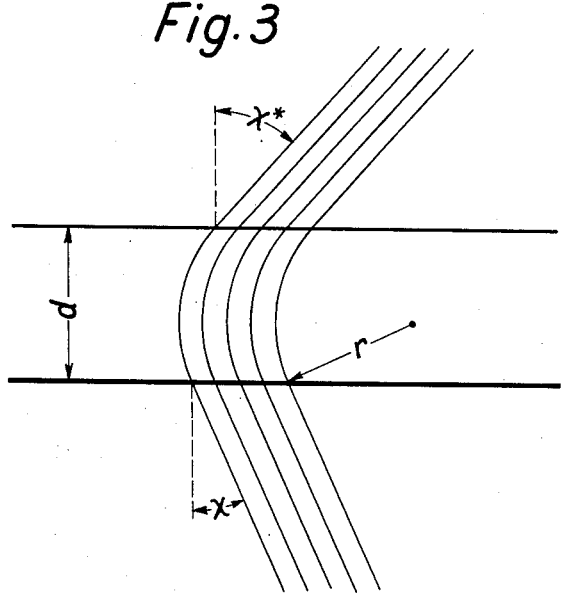
Figure 3 is similar to Figure 2, except that the angle of incidence of the deflected beam is inclined with respect to the normal to the boundary planes.

Of course, if one desires to deflect through an angle near to the upper limit of 90 degrees or even more, there are two possibilities. One such possibility is shown in Fig. 3, in connection with which the parallel beam of rays enters the deflecting field at an angle of incidence $\chi$ with respect to the normal to the incident boundary plane and emerges with an angle $\chi^*$ with respect to the normal to the boundary plane of emergence. There then applies the general law of refraction for such magnetic fields:

(3) $$\frac{d}{r} = \sin \chi - \sin \chi^*$$

The total deflection $\epsilon$, is then $\epsilon = \chi - \chi^*$.

In this connection, the angles are calculated as in geometrical optics, with respect to the lines normal to the planes of incidence and emergence, the algebraic sign being determined by the mathematically positive or negative direction of each angle with respect to the normal to the boundary plane.

Figure 4:
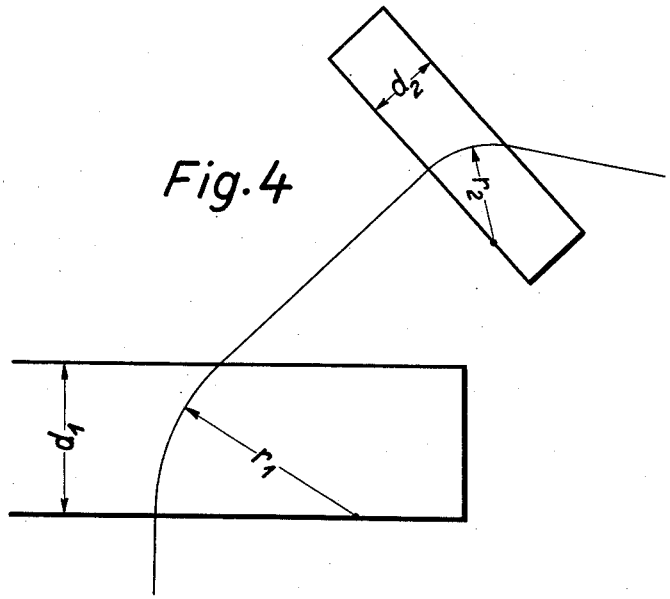
Figure 4 shows a compound electron-optical prism system in which the ray is deflected twice, the parallel boundary planes of the two uniform fields being shown with different spacings.

In order to obtain larger deflection angles than 90°, one may also proceed in accordance with Fig. 4 by arranging two or more pairs of pole faces with their boundary planes at a given angle with respect to each other. In this connection, the individual pole faces may in whole or in part be formed on a single piece of magnetic material, the distance between the boundary planes being either of the same or different dimensions, as desired.

In the case of separte pole faces, the flux density or magnetic induction between all or between a given number of pole faces, as well as the distance between their boundary planes may be different. For each individual magnetic field, however, there applies the law of refraction given above in Equation 3.

On basis of another example, it will be shown that large deflections are also obtainable with two sets of pole faces which provide boundary planes parallel to one another.

Figure 5:
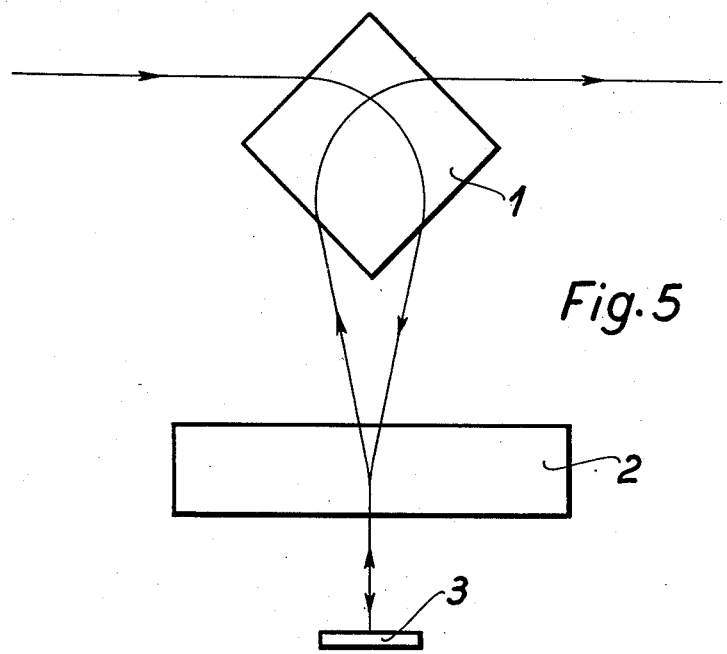
Figure 5 is a diagrammatic representation of a compound electron-optical prism system in which the beam of rays is deflected twice, reflected, and deflected twice again to emerge from the system in its original direction of travel.

In Fig. 5 such a system is diagrammatically shown, there being provided in addition to the deflecting fields 1 and 2, an electron-optical mirror 3. This system is equivalent to four pole faces with parallel boundary planes inasmuch as each uniform field is traversed twice. As can be noted from the drawing, the directions of the magnetic fields in the two separate pairs of pole faces must be opposite. Furthermore, in connection with this system, the magnetic induction or flux density in the two pairs of pole faces is made different. Such electron-optical systems consisting of magnetic fields having plane parallel limiting surfaces, will at all times satisfy requirement 1 with respect to parallel rays. They can be used like optical prisms. In particular, it is possible to deflect images by any desired angle without distortion if the rays are made parallel before entering the deflecting field by electron-optical or ion-optical means.

If it is desired to form the image of a source for instance an electron source, or, in general, to form an image by electrons or ions by means of the electron-optical system, one must accommodate beams of non-parallel rays (i. e. convergent or divergent beams of rays).

For a narrow beam within Gaussian dioptrics, the electron-optical systems of the present invention comply in this respect with requirements 1 to 3 set forth above. In this connection, Fig. 6 may be explained by way of introduction. The law of refraction according to Equation 3 also applies in this case.

For any particular convergent or divergent ray of the beam which is inclined by a small angle $\varphi$ with respect to the principal ray or optical axis of the beam, the following formula applies:

(4) $$\frac{d}{r} = \sin \varphi_1 - \sin \varphi_2$$

in which (5) $$\varphi_1 = \chi + \varphi_1'$$

where $\varphi_1$ is the angle of incidence of the particular ray and $\varphi_1'$ is the angle of convergence or divergence between the ray under consideration and the optical axis of the beam before entering the deflecting field, (6) $$\varphi_2 = \chi^* - \varphi_2'$$

where $\varphi_2$ is the angle of emergence of the particular ray and $\varphi_2'$ is the angle of convergence or divergence between the ray under consideration and the deflected principal beam after emerging from the field.

For the converging or diverging rays inclined to the optical axis of the beam, there applies the equation (7) $$\varphi_1' = \varphi_2' \frac{\cos \chi^*}{\cos \chi}$$

in other words, the individual inclination of each emerging ray is equal to that of the corresponding entering ray if the angles of incidence and of emergence of the principal ray or optical axis of the beam are equal, which condition may readily be attained in practice.

Figure 6:
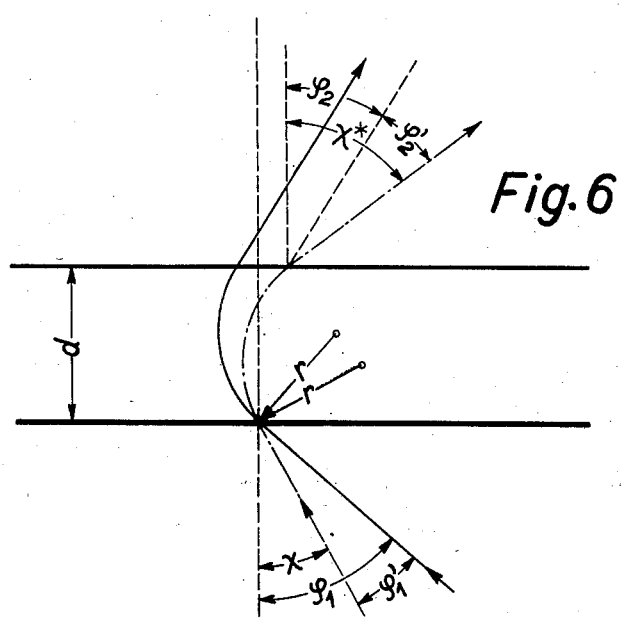
Figure 6 is similar to Figure 3, except that the beam of rays is assumed to be convergent at the boundary plane of incidence.

If one considers a single pair of pole faces with parallel boundary planes into which a slightly convergent beam enters, it will be clear from Fig. 6 that the distance to the virtual crossover point of the emerging beam, i. e. the point of intersection of the rearwardly extended emerging rays, is not the same for all angles of incidence of the beam. This requirement (requirement No. 2, above) is fulfilled, however, in the case of pole faces of angular configuration. If it is intended to deflect a convergent or divergent beam by a larger angle than is practicable with a single pair of pole faces, and taking into account the fact that a grazing or glancing angle of emergence is to be avoided, one will again operate, as previously, with a plurality of pairs of pole faces, in which connection the pole face pairs may have the same or different widths between boundary planes and the magnetic induction or flux density in the pole faces may be the same or different as desired.

Figure 8:
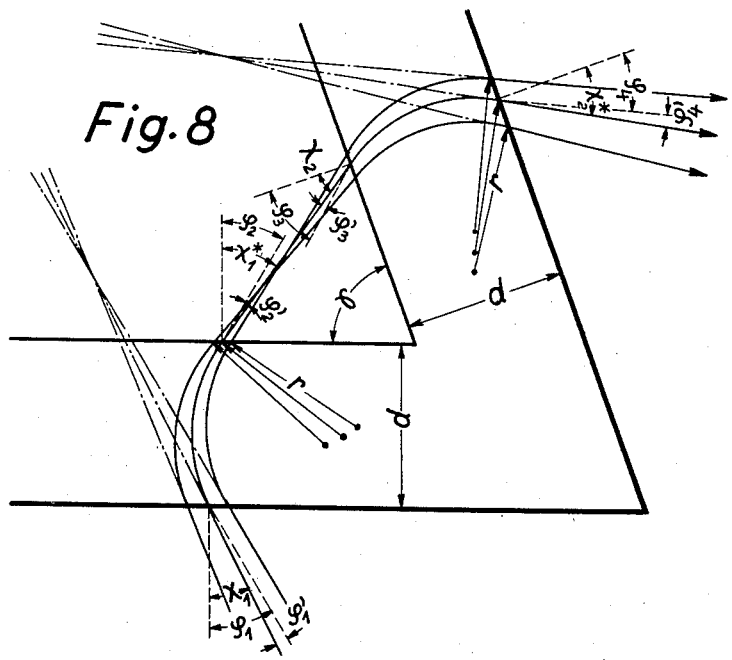
Figure 8 is similar to Figure 7, except that the pole faces are of V-shaped configuration and the incident beam is convergent.

If one carries out the same calculation as led to Equation 7 for a pair of pole faces of angular configuration as shown in Fig. 8 (in which connection, for the sake of simplification, $d$ and $r$ are here assumed to be constant for simplicity of illustration without limiting the general applicability of this analysis), one arrives at the equation (7a) $$\varphi_4' = \varphi_1' \frac{\cos \chi_1}{\cos \chi_1^*} \frac{\cos \chi_2}{\cos \chi_2^*}$$

In other words, only when the product of the quotients of the cosines of the angle of incidence and the angle of emergence of the principal beam is equal to 1 will we have $\phi_4' = \phi_1'$. Inasmuch as this requirement can be met by divers means, it is necessary to decide which of these simultaneously meets all the three requirements set forth above. One then arrives at an equation of condition which leads to a special system which will now be explained.

In order to satisfy the above requirements 2 and 3 with respect to convergence and astigmatism, respectively a special case is considered below.

Figure 7:
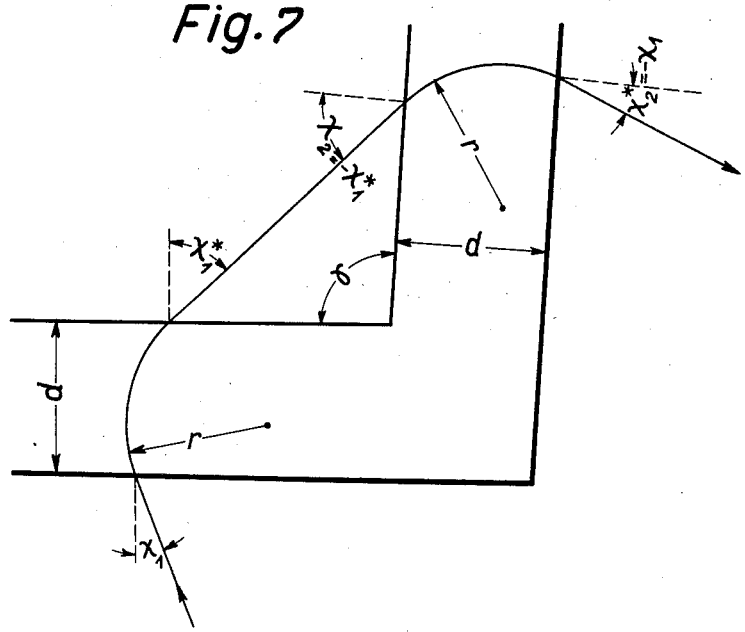
Figure 7 is a diagrammatic representation of a compound prism system in which the plane parallel pole faces of a single magnet are of L-shaped configuration, the beam being deflected once by each leg of the L.

In Fig. 7 there is shown an angular pole face, the angle of inclination of the boundary planes of the two pole face portions being designated $\gamma$. By appropriate selection of values for $d$ and $r$, it can be so arranged that the angles $\chi_1^*$ and $\chi_2$ shown in Fig. 7, are numerically equal at a given angle $\chi_1$. In such case, the illustrative electron ray then emerges from the boundary plane of the second pole face at an angle such that $\chi_2^* = -\chi_1$. If $d$ and $r$ are maintained constant, the total deflection is (7b) $$\epsilon = 2|\chi_1| + 2|\chi_1^*|$$

in which the dihedral angle $\gamma$ between the boundary planes of the pole face must be equal to $2|\chi_1^*|$ where $|\chi_1^*|$ denotes the absolute value of the angle without regard to its algebraic sign. It can be shown analytically that for a predetermined total angle of deflection $\epsilon$ and given values of $d$ and $r$, the angles $\chi_1$ and $\chi_1^*$ and the angle $\gamma$ can be so determined that the electron-optical system complies with all three of the above requirements.

As a further parameter, there is used in this connection the length $j$ of the path of travel of the principal beam or optical axis between the two deflecting fields. The length of the straight path $j$ is expressed in terms of $r$. A general systematic analytical derivation for pole faces with constant values of $d$ and $r$ shows three classes having ten different possibilities of pole face arrangements, in which connection only the one shown in Fig. 7 is actually anastigmatic, in view of what has been stated above.

The computation for this case shows that between the angles $\chi_1$ and $\chi_1^*$ and the length of intermediate path $j$, the following relationship exists:

(8) $$2 \sin \{|\chi_1| + |\chi_1^*|\} \frac{\cos \chi_1}{\cos \chi_1^*} + j \frac{\cos^2 \chi_1}{\cos^2 \chi_1^*} = j + \frac{|\chi_1| + |\chi_1^*|}{90°} \pi$$

In Fig. 8 there is shown by way of example a beam of rays passing between a pair of pole faces of angular configuration which complies with the above conditions.

Figure 9:
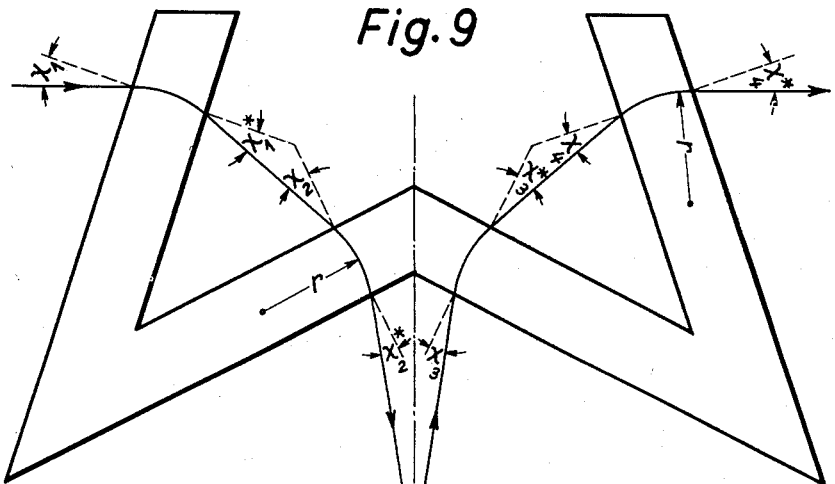
Figure 9 is a diagrammatic representation of a compound prism system in which the parallel pole faces are of W-shaped configuration, the beam being initially deflected twice by two adjacent legs of one V-shaped portion of the W, deflected again, reflected, re-deflected after reflection, and deflected twice more by the other two adjacent legs of the W.

It is of course not necessary that such an angular pole face structure should be integrally formed from a single piece of magnetic material. Therefore, it is also unnecessary for the magnetic induction or flux density in each individual pole face to be the same, provided only that the product $d \cdot B$, i. e. the product of the distance between boundary planes and the flux density in each pole face shall be the same. From the above-considered examples, however, such forms of construction can easily be designed. Two further examples are shown in Figs. 5 and 9.

For the cases given, each electron or ion ray having any desired angle of incidence behaves in first approximation in the manner indicated in the laws of refraction for the angles of incidence of 0 and 180°.

It can furthermore be shown that by a suitable selection of the pole face configuration, errors of the second order will also disappear in certain cases.

By use of an electron-optical system embodying magnetic deflecting fields in accordance with the present invention, special techniques of deflection can readily be carried out. In Fig. 9 it is shown how an electron-optical system for a deflection of 90 degrees can be constructed which fully meets the ideal requirements 1 to 3 and with which a beam of charged particles is not only deflected 90 degrees, but is again deflected 90 degrees by another passage through the electron-optical system, the second passage being subsequent to a reflection of the beam. For instance, in the case of electron microscopy by means of potential fields, in connection with which surfaces are imaged by a method in which a potential area near the surface of the object is used as reflecting area for the electrons, the reflecting area being normal to the angular bisector of the inverted V portion of the W-shaped structure 5. The forward-moving and backward-moving electrons must be separated. In this case, the electron-optical system, shown diagrammatically in Fig. 9, can be successfully used, in which the electrons arriving from the cathode, and which produce the image of the object 4 are first deflected 90 degrees and the backwardly accelerated returning electrons, i. e. those which come from the object, must be again deflected through 90 degrees. The W-shaped system 5 shown in Fig. 9 meets all of the requirements 1–3. In order to be able to separate the backward-moving electrons from the forward-moving ones, a slightly refractive additional magnetic field shown as a rectangle is used. The deflection errors of this additional field can be neglected because of the small magnitudes of the angles of incidence and emergence.

Attention should now be called also to the following: All pole face structures, no matter how they are constructed, inherently have a stray or non-uniform fringe field. The stray fields of the systems in accordance with the invention, have an effect similar to a cylindrical lens causing distortion of the image. In order to eliminate this distorting influence of the stray or fringe fields, two different methods are used in accordance with the invention and constitute an important feature enlarging the scope of applicability of the deflective fields of the invention.

The first method consists in utilizing an electron-optical system comprising pole faces of angular configuration according to the present invention, and in focusing the beam of charged particles approximately at the plane of the bisector of the dihedral angle between the arms of the pole faces to produce a real image at this plane, for instance, the image of a cathode. Thus, the distortion which is produced by the stray field of the first part is exactly compensated during subsequent deflection of the beam passing through the angular pole face by the stray field of the second part, regardless of how large the stray fields or fringe effects may be, provided only that they are equal both as to magnitude and distribution in the two parts of the angular pole face structure. This compensation takes place after the crossover which occurs at the focal plane, where the converging beam becomes divergent.

The second method consists in placing in front of the pole pieces a magnetic diaphragm, the magnetic reluctance of which is very small. Due to this, the stray flux near the boundary planes is shunted and does not act on the charged particles.

Figure 10:
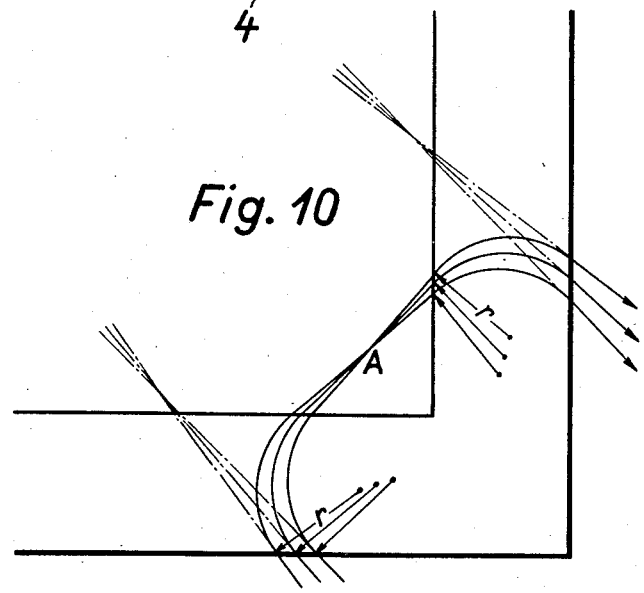
Figure 10 is similar to Figure 7, except that the incident beam is assumed to be convergent and converges to form a real image after its first deflection, being divergent during its second deflection, whereby fringe effects are corrected.

In Figs. 10 and 11, the arrangements for practicing the two methods are shown diagrammatically. Due to the fact that the incoming convergent beam crosses over and becomes divergent at point A in Fig. 10, according to the first method, the distortions which are produced upon entrance of the beam into the pole face structure by the stray fields thereof are exactly compensated during emergence, provided that the stray fields are of the same value and distribution.

In Fig. 11, two apertured magnetically permeable diaphragms 7, of a suitable magnetizable material are placed adjacent to the pole pieces, which diaphragms present a high permeability and hence a smaller magnetic reluctance than the surrounding vacuum, so that the stray field passes principally through the two diaphragms.

The few lines of force in the space between each diaphragm and the pole pieces proper are, however, made marginally parallel so that they cannot produce any significant distortion. The field distribution pattern with and without the magnetic diaphragms is shown by the graph in Fig. 12. The vertical dotted line at $d/2$ indicates the boundary plane of the pole faces, $a$ the field distribution pattern without any magnetic diaphragm, and $b$ the field pattern using the magnetic diaphragm. It can be seen from the two distribution curves that the drop of the field intensity with the diaphragm is considerably steeper and more abrupt, although, to be sure, one does not obtain the full original magnetic induction or flux density in the pole faces with the same magnetic excitation. The use of the diaphragm thus provides a much closer approach to the ideal boundary plane characteristic represented by the vertical dotted line $d/2$ than does the magnetic structure without the apertured diaphragms. The apertures are appropriately located in the diaphragms 7 to permit the passage therethrough of the incident and emerging beams of charged particles.

The electron-optical system with magnetic deflecting fields of the present invention can also be successfully used for instance in connection with mass spectrographs or spectrometers. The present mass spectrographs which operate with sector fields have as an electron source, a thin slit. With the conventional focusing sector field, it is only possible to utilize the aperture in one direction with respect to the entire electron output of the source. By the non-focusing deflecting fields of the present invention, it is possible to use circular sources and to utilize the entire electron output of the source, at least in the ideal case. Due to this, as shown by calculation, the efficiency with respect to the ray current intensity is incrased about 40 times. For electron microscopes, special possible uses have been described above. Similarly, electronic switches in which a point electron source is to be focussed at any desired angle, are also a field of use for the electron-optical system of the present invention.

Use of these electron-optical systems in electron multipliers in connection with which a deflection of the rays is necessary is also possible.

It will be clear from the foregoing description that the invention will operate equally well whether the charged particles be electrons or ions. In the case of electrons, of course, the entire structure will be enclosed in an evacuated vessel to avoid interference by ions or gas molecules with the electron beam.

Figure 15:
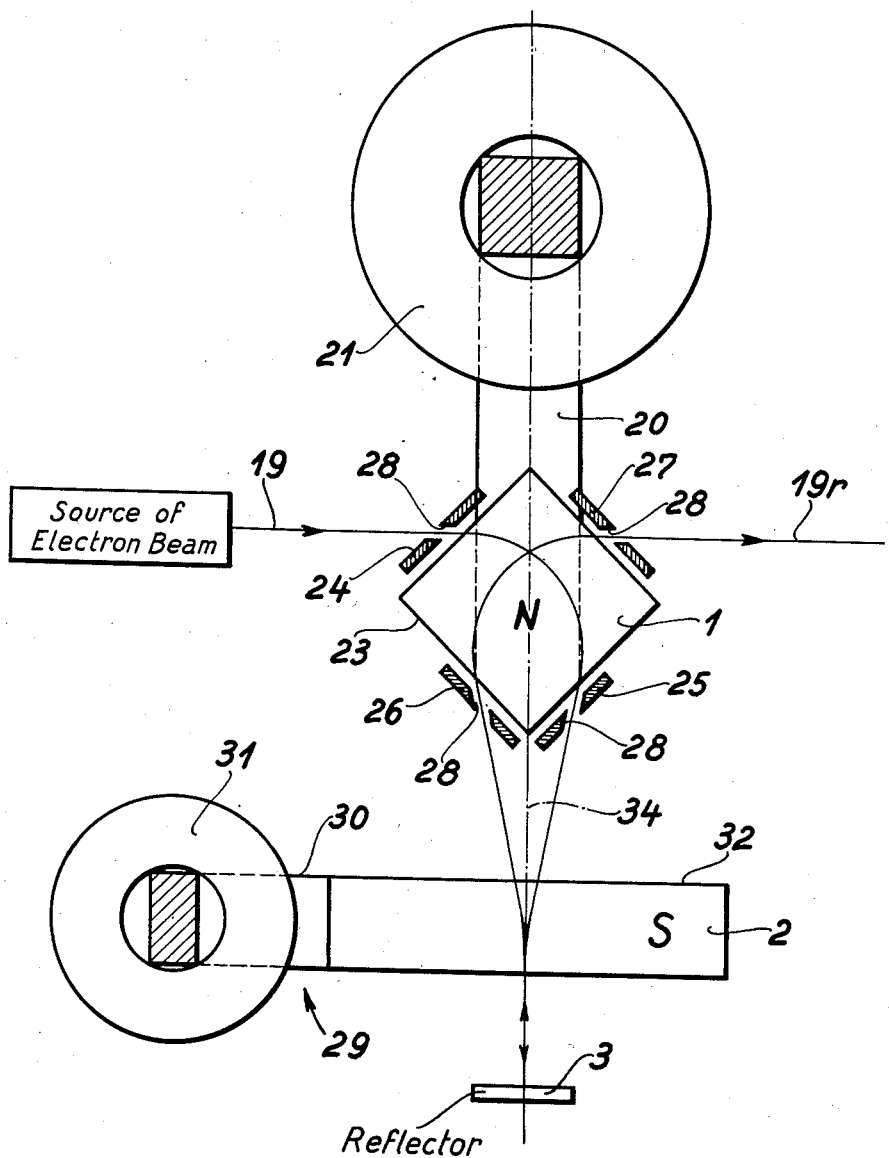
Figure 15 is a plan sectional view taken along the line 15—15 of Fig. 14.

Referring to Figures 14 and 15, there is shown an apparatus for the deflection of a beam of charged particles 19 in accordance with the diagrammatic illustration of Figure 5, this system comprising an electromagnet having a U-shaped yoke 20 and a magnetomotive force producing winding 21 arranged to be energized from a suitable source of direct current, not shown. Mounted on the yoke 20 are opposed pole pieces 22 and 23 having spaced parallel plane pole faces 1 and 1a, respectively, each shaped in the form of an equilateral parallelogram, illustratively shown as a square. The juxtaposed pole faces 1 and 1a are of identical size and configuration and the magnetic flux passes from pole face 1 to pole face 1a perpendicularly with respect to the spaced parallel planes thereof.

Fringe effect correction means are provided, as in Figure 11, by a plurality of magnetically permeable apertured diaphragm members 24, 25, 26 and 27, each having a plane surface disposed in proximity to and parallel to one of the sides of the equilateral parallelogram-shaped pole faces 1 and 1a, each of the apertures 28 being aligned with respect to the arriving beam of charged particles 19, or a reflected beam 19r to permit passage of the beam therethrough.

The apertures 28 are of circular cross-section and the axes thereof are shown inclined in the direction of travel of the charged particles to facilitate passage of the beam 19 or 19r therethrough as the arriving beam 19 passes successively through the apertured diaphragms 24 and 25, and the reflected beam 19r passes through the diaphragms 26 and 27, in the order named.

A further magnetic structure 29 is provided, and comprises the U-shaped yoke 30 and a separate magnetomotive force producing winding 31 arranged to be energized from a suitable source of direct current, not shown. The yoke 30 is provided with opposed pole pieces 32 and 33 with spaced plane parallel pole faces 2 and 2a which are parallel to the planes of the parallelogram-shaped pole faces 1 and 1a and are aligned with respect thereto to permit a pair of spaced parallel path defining planes, not shown, to pass both between the parallelogram-shaped pole faces 1 and 1a and also between the pole faces 2 and 2a of the further magnetic structure 29. The beams 19 and 19r are confined between the path defining planes which are preferably but not necessarily parallel to the planes of the pole faces 1 and 2.

The pole faces 2 and 2a of the further magnetic structure 29 are of equal widths determined by spaced parallel boundary planes perpendicular to a diagonal 34 of the parallelogram, this width being traversed once by the arriving beam of charged particles 19 and once by the reflected beam 19r. The magnetic flux of the further magnetic structure passes perpendicularly with respect to the pole faces 2 and 2a from pole face 2a to pole face 2, but in the direction opposite to that of the flux passing between parallelogram-shaped pole faces 1 and 1a so that the direction of curvature of the path of the beams 19 and 19r in passing between the parallelogram-shaped pole faces 1 and 1a is opposite to that of its curvature in passing between the pole faces 2 and 2a of the further magnetic structure 29. Moreover, the amount of curvature and the accompanying deflection in passing between the pole faces 2 and 2a of the further magnetic structure 29 is considerably less than that in passing between the parallelogram-shaped pole faces 1 and 1a, and it has therefore been assumed that fringe effects may be neglected in the further magnetic structure 29. Accordingly, no apertured diaphragm members have been shown. Such diaphragm members may be added, however, if desired.

A reflecting surface 3, which may be an object whose image is to be impressed upon the beam 19, a secondary emission cathode, the mosaic of a picture scanning tube, or other similar device, is normal to the diagonal 34 of the parallelogram-shaped pole face 1 and is spaced beyond the pole faces 2 and 2a of the further magnetic structure 29 in close proximity thereto.

In operation, the beam 19 passes through diaphragm 24 across one of the sides of the parallelogram-shaped pole face 1 and is deflected through an angle slightly greater than 90°, emerging across the opposite parallel side and through the aperture 28 of the diaphragm 25. The beam 19 then travels linearly without deflection to the additional magnetic structure 29 where it passes between the pole faces 2 and 2a thereof, being deflected in the opposite direction by the oppositely directed field therebetween by an angle equal to said slight angle of excess and emerges directly above and parallel to the diagonal 34 of the parallelogram-shaped pole face 1. The beam 19 then continues to the reflecting surface 3. From the reflecting surface 3, the reflected beam 19r, accelerated by suitable fields, not shown, returns along its path of arrival and is diverted away from the diagonal 34 of pole face 1 by the amount of the slight difference angle in order to enter the aperture 28 of diaphragm 26. The reflected beam 19r, then traverses the parallelogram-shaped pole face 1 crossing the other pair of opposite parallel sides thereof and emerging, after again being deflected through the same angle slightly greater than 90°, substantially in alignment with the arriving beam 19 and traveling in substantially the same direction as the arriving beam 19, modified, however, by any effects produced by the reflecting surface 3.

Figure 17:
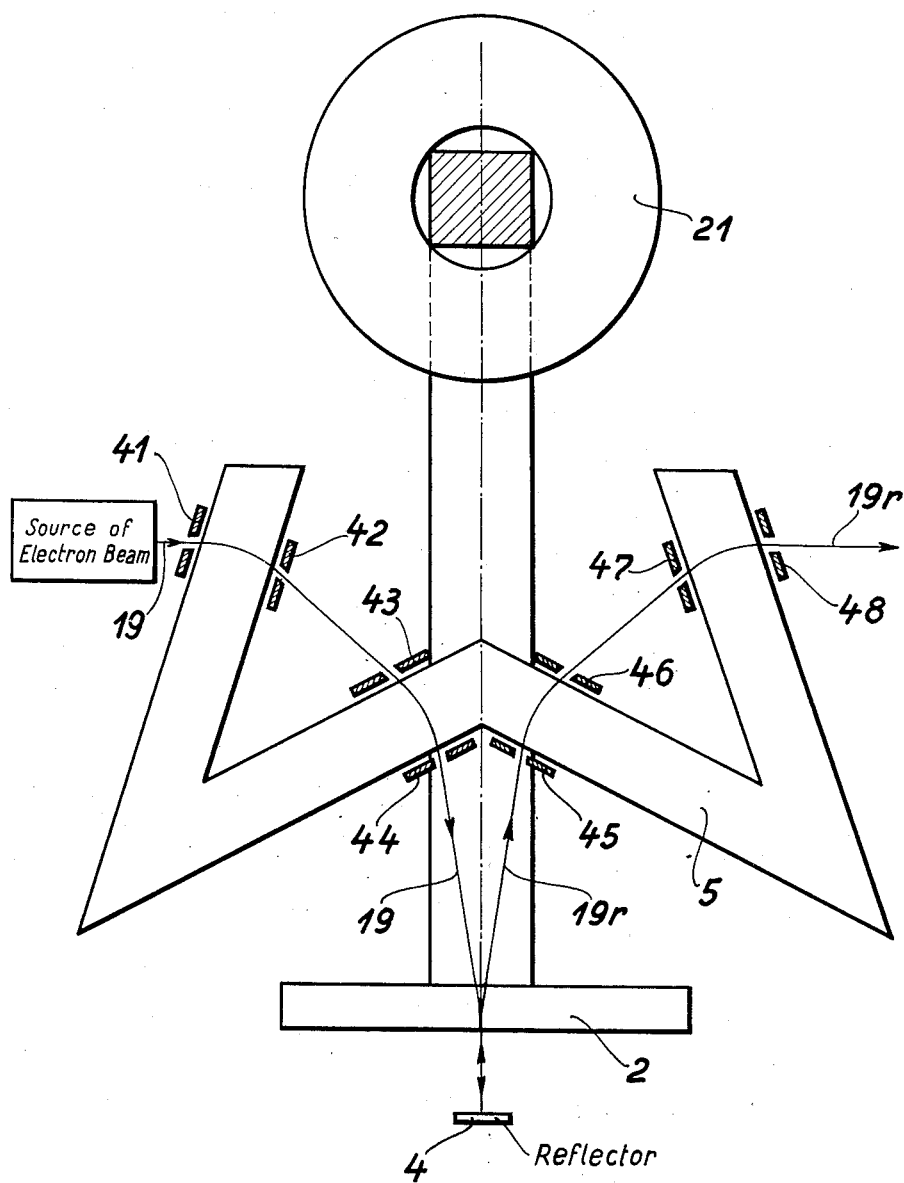
Figure 17 is a plan sectional view taken along the line 17—17 of Fig. 16.

Figures 16 and 17 illustrate an embodiment of the invention otherwise similar to Figures 14 and 15, except that the parallelogram-shaped pole faces 2 and 2a have been replaced by the W-shaped pole faces 5 and 5a as shown in Figure 9, and which cause the arriving beam 19 to be initially twice deflected by passing through one of the two V-shaped portions of the W, and the reflected beam 19r is likewise twice deflected by passing through the other V-shaped portions of the W.

In Figures 16 and 17, the flux of further magnetic structure passes between the parallel pole faces 2 and 2a of pole pieces 36 and 37 in the same direction as the flux passing between the W-shaped pole faces 5 and 5a of the pole pieces 38 and 39. Accordingly, the pole pieces 36 and 37 of the further magnetic structure have been shown mounted on a common U-shaped yoke 40, along with the pole pieces 38 and 39 having the W-shaped pole faces 5 and 5a.

The operation of the arrangement of each V-shaped portion of Figures 16 and 17 may be in accordance with that described above for the V-shaped structure of Figure 8, in which the angle of convergence or divergence remains unchanged, or it may be arranged as in Figure 10, in which a real image is formed at the bisector plane of the dihedral angle between the boundary planes of each V-shaped portion of the W. In this manner, the use of any magnetically permeable diaphragm members may be rendered unnecessary for the avoidance of aberrations caused by fringe effects at the boundary planes of the pole faces 5 and 5a.

In the event that the arrangement of Figure 10 is not used, and that fringe effect correction means are required, then the magnetically permeable apertured diaphragm members 41 to 48 may be provided and disposed as indicated in Figure 17. The arriving beam 19 will first pass through diaphragms 41 and 42 in crossing the first leg of the W-shaped pole faces 5 and 5a and then pass through diaphragms 43 and 44 in passing through the second leg thereof. In the course of this passage, the arriving beam 19 is twice deflected, the total angle of deflection being slightly less than 90°. The beam 19 then passes between the pole faces 2 and 2a of the further magnetic structure, where it is deflected through an angle equal to the slight difference angle by which the previous total angle is less than 90°, and is then reflected by the reflecting surface 4, similar to the surface 3 shown in Figures 5, 14 and 15. The reflected beam 19r returns over a path symmetrical with respect to that of the arriving beam 19, the reflected beam 19r being diverted after reflection through the same slight difference angle toward the other V-shaped portion of the W-shaped pole faces 5 and 5a, and being again twice deflected through an angle slightly less than 90° to resume a path substantially in the same direction and in alignment with the original path of the arriving beam 19.

In Figures 16 and 17, the spaced parallel boundary planes which are determinative of the width of the pole faces 2 and 2a and the plane of the reflecting surface 4 are all perpendicular to the angular bisector of the central inverted V portion of the W-shaped pole faces 5 and 5a, and this angular bisector is the axis of symmetry of the deflected paths of the arriving and emerging beams 19 and 19r.

The systems of Figures 5, 14 and 15 and the systems of Figures 9, 16 and 17 both provide a short common path along which the charged particles of the arriving beam 19 are traveling in the direction opposite to the particles of the reflected beam 19r. By positioning the reflecting surface 3 of Figure 5 or 4 of Figure 9 in close proximity to the pole faces 2 and 2a of the further magnetic structure, the length of this common path is shortened and interference effects are reduced.

We claim:

1. An anastigmatic electron-optical prism of the class described, for deflecting a beam of charged particles through a total predetermined angle, said prism comprising: a pair of pole pieces having oppositely disposed coextensive parallel plane pole faces, said pole faces having equal widths determined by spaced parallel boundary planes perpendicular to said pole faces; flux producing means operatively associated with said pole pieces for causing magnetic flux to flow therebetween substantially parallel to said boundary planes and perpendicularly with respect to said plane pole faces; and fringe effect correcting means comprising magnetically permeable apertured diaphragm members, each having a plane surface extending in proximity to and parallel to one of said boundary planes for shunting the stray fringe field; said pole pieces being disposed to receive therebetween a beam of charged particles traveling in a path passing between said boundary planes and said pole faces and lying in a plane parallel to said pole faces will be deflected through said predetermined total angle, said apertures in said diaphragms being disposed to permit passage therethrough of said beam both before and after said deflection, said total angle of deflection being in accordance with the relationship:

$$d \cdot B = \frac{mv}{e}(\sin \chi_1 - \sin \chi_1^*)$$

where $d$ is the width of the deflecting field between the boundary planes;

$B$ is the magnetic flux density of the deflecting field;

$m$ is the individual mass of the charged particles;

$v$ is the velocity of the charged particles;

$e$ is the individual charge of each particle;

$\chi_1$ is the angle of incidence of the beam axis with respect to the normal to the boundary planes;

$\chi_1^*$ is the angle of emergence of the beam axis with respect to the normal to be boundary planes;

$\chi_1 - \chi_1^* =$ the magnitude of the predetermined total angle of deflection.

2. An electron-optical prism according to claim 1, in which said pole faces are of V-shaped configuration, said equal widths of said pole faces being determined by two intersecting pairs of spaced parallel boundary planes, a portion of said total angle of deflection of said beam being caused by each leg of said V.

3. An electron-optical system of the class described, comprising: a magnetic structure including a pair of opposed pole pieces with spaced plane parallel pole faces of W-shaped configuration with magnetic flux passing between said pole faces perpendicularly with respect to said spaced parallel planes; a further magnetic structure comprising a pair of opposed pole pieces with spaced plane parallel pole faces parallel to said planes of said W-shaped pole faces and aligned to permit a pair of spaced parallel path defining planes to pass between said W-shaped pole faces and said last-named pole faces, said last-named pole faces having equal widths determined by spaced parallel boundary planes perpendicular to the angular bisector of the inverted-V portion of said W with magnetic flux passing between said pole faces perpendicularly with respect to the planes thereof; and reflecting means perpendicular to said bisector and spaced beyond said last-named pole faces in close proximity thereto, whereby a beam of charged particles traveling in a horizontal path intermediate the base and the top of said W and intermediate said path defining planes will be deflected twice by passing intermediate the two pole face portions forming one of the two upright V portions of said W and will travel toward said further magnetic structure passing between the pole faces thereof, be reflected by said reflecting means, be returned through said further magnetic structure, be diverted toward the other of the upright V portions of said W and be deflected twice in passing therethrough to resume substantially its original direction of travel modified by any effects produced by said reflecting means.

4. An electron-optical system according to claim 3, further comprising fringe effect correcting means, said correcting means comprising a plurality of magnetically permeable apertured diaphragm members, each having a plane surface extending in proximity to one of the sides of one of the legs of said W, each of said apertures being aligned between said path defining planes for passage of said beam therethrough.

5. An electron-optical system of the class described, comprising: a magnetic structure including opposed pole pieces having spaced plane parallel pole faces shaped in the form of an equilateral parallelogram with magnetic flux passing between said pole faces perpendicularly with respect to said spaced parallel planes; a further magnetic structure comprising opposed pole pieces with spaced plane parallel pole faces parallel to said planes of said parallelogram-shaped pole faces and aligned to permit a pair of parallel spaced path defining planes to pass between said parallelogram-shaped pole faces and said last-named pole faces, said last-named pole faces having equal widths determined by spaced parallel boundary planes perpendicular to a diagonal of said parallelogram with magnetic flux passing between said last-named pole faces perpendicularly with respect to the planes thereof and oppositely directed with respect to the flux passing between said parallelogram-shaped pole faces; and reflecting means perpendicular to said diagonal and spaced beyond said last-named pole pieces in close proximity thereto, whereby a beam of charged particles traveling in a path perpendicular to said diagonal and intermediate said path-defining planes will be deflected toward said diagonal by passing between said parallelogram-shaped pole faces and across one pair of opposite sides thereof and will travel toward said further magnetic structure, passing between the pole faces thereof, be reflected by said reflecting means, be returned through said further magnetic structure, be diverted away from said diagonal, and pass again between said parallelogram-shaped pole faces crossing the other pair of opposite sides thereof and being deflected during said last-named passage to resume substantially its original direction of travel modified by any effects produced by said reflecting means.

6. An electron-optical system according to claim 5, further comprising fringe effect correcting means, said correcting means comprising a plurality of magnetically permeable apertured diaphragm members, each having a plane surface extending in proximity to one of the sides of the equilateral parallelogram, each of said apertures being aligned for the passage of said beam therethrough.

References Cited in the file of this patent

UNITED STATES PATENTS

| 1,779,794 | Ackermann | Oct. 28, 1930 |
| 2,211,613 | Bowie | Aug. 13, 1940 |
| 2,249,041 | Ramberg et al. | July 15, 1941 |
| 2,429,558 | Marton | Oct. 21, 1947 |
| 2,460,402 | Sziklai | Feb. 1, 1949 |
| 2,473,477 | Smith | June 14, 1949 |
| 2,531,050 | Hutter | Nov. 21, 1950 |
| 2,544,718 | Nier | Mar. 13, 1951 |
| 2,615,128 | Ruderfer | Oct. 21, 1952 |
| 2,636,999 | Hewitt | Apr. 28, 1953 |